United States Patent [19]

Kobayashi et al.

[11] 4,199,983
[45] Apr. 29, 1980

[54] APPARATUS FOR DETECTING THE LEVEL OF LIQUID IN A TANK

[75] Inventors: Shozaburo Kobayashi, Takatsuki; Kenji Yamauchi, Yokohama, both of Japan

[73] Assignee: Dodwell & Company Limited, London, England

[21] Appl. No.: 932,424

[22] Filed: Aug. 10, 1978

[30] Foreign Application Priority Data

Aug. 22, 1977 [JP] Japan .................. 52-112101[U]

[51] Int. Cl.² .......................................... G01F 23/14
[52] U.S. Cl. ................................... 73/302; 73/308
[58] Field of Search .................. 73/302, 313, 308

[56] References Cited

U.S. PATENT DOCUMENTS

| | | | |
|---|---|---|---|
| 1,840,748 | 1/1932 | Star | 73/302 X |
| 1,860,209 | 5/1932 | Slough | 73/302 |
| 1,950,595 | 3/1934 | Clason | 73/302 |
| 3,181,556 | 5/1965 | Baker | 73/302 X |
| 3,190,119 | 6/1965 | Isobe et al. | 73/302 |
| 3,969,942 | 7/1976 | Hope et al. | 73/302 |
| 3,987,675 | 10/1976 | Harrison | 73/302 |

*Primary Examiner*—Daniel M. Yasich
*Attorney, Agent, or Firm*—Martin A. Farber

[57] ABSTRACT

In an apparatus for detecting the level of fuel oil in a tank of a vessel to control the quantity of fuel oil in the tank, a sensing pipe having a sensing hole in its lower portion is inserted into the tank and gas is continuously supplied into the sensing pipe. Hence, the pressure in the sensing pipe is continuously increased as the level of fuel oil is raised above the level of the sensing hole. When this pressure reaches a desired value, a fluid pressure response device connected to the sensing pipe is operated by the pressure to operate an alarm device, thereby to detect the level of fuel oil above the sensing hole. The pressure in the sensing pipe required to operate the alarm device can be set to a desired value.

9 Claims, 5 Drawing Figures

APPARATUS FOR DETECTING THE LEVEL OF LIQUID IN A TANK

BACKGROUND OF THE INVENTION

This invention relates to apparatuses for detecting the level of fuel oil in a tank of a vessel over a wide range of from the level of a sensing hole and a level sufficiently high above the sensing hole, and more particularly an apparatus in which a critical overflow level corresponding to the trim of a vessel can be readily, accurately and safely detected, whereby it is possible to fill the tank with fuel oil to a suitable quantity and to prevent the fuel oil from flowing over the tank.

Accidents concerning fuel oil overflow in vessels, in general, result in heavy losses. For instance, the overflow of fuel oil of one ton leads to the loss of one hundred million yen. Most of the causes of the accidents are mishandling of fuel oil during the fuel oil filling operation.

Accordingly, in order to prevent such an accident, it is absolutely necessary to accurately detect if the level of fuel oil reaches the critical overflow level. In the case where a vessel has a trim, the critical overflow level is varied in accordance with the trim, and therefore it is required to detect the critical overflow level corresponding to the trim.

There have been proposed a number of apparatus for detecting such a critical overflow level. For instance, a level gauge and a differential pressure signal generator are known in the art. However, these conventional apparatuses are disadvantageous in that they are too intricate in construction and accordingly too high in cost, and are rather difficult in handling and yet low in accuracy.

The application has proposed a critical overflow level detecting apparatus, as shown in FIG. 1, before. In this apparatus, a sensing pipe 1 having a sensing hole 2 at the lower portion is provided. The sensing pipe 1 is inserted into a fuel tank, and air is fed into the sensing pipe 1. The air is discharged out of the sensing hole 2. As the fuel oil level is raised, the sensing hole 2 is covered with the fuel oil, whereupon the pressure in the sensing pipe 1 is increased. In response to the pressure thus increased, an alarm is issued, thus detecting the critical overflow level. This apparatus is advantageous in that the operation is simple, and the critical overflow level can be detected positively and safely. (Japanese Utility Model Application No. 29250/1977).

However, the apparatus described above is still disadvantageous in the following points:

If, in the case where the position of the sensing hole 2 has been determined on the basis of the maximum trim of a vessel as shown in FIG. 2, a fuel oil filling operation is carried out with the vessel having no trim, then the alarm will be issued before the level of fuel oil reaches the critical overflow level DH, as a result of which it is impossible to sufficiently fill the tank with fuel oil. In contrast, if, in the case where the position of the sensing hole 2 has been determined to a position 2' with the vessel having no trim, the fuel oil filling operation is carried out with the vessel in the maximum trim, then the alarm will be issued after the level of fuel oil is excessively raised over the critical overflow level (DL). In this case, undoubtedly the fuel oil is caused to flow over the tank. This will become more significant in the case where as indicated by the phantom line in FIG. 2, the position of the sensing pipe 1 is closer to the side wall of the tank. Especially when the existing sounding pipe is employed as the sensing pipe 1; the above-described phenomenon takes place significantly, because the sounding pipe is, in general, provided along the side wall of the tank.

SUMMARY OF THE INVENTION

Accordingly, an object of this invention is to provide an apparatus in which a critical overflow level is detected in correspondence to a current trim of a vessel, whereby it is possible to prevent fuel oil from flowing over the tank and it is possible to fill the tank with fuel oil to a suitable quantity.

Another object of the invention is to provide an apparatus in which the level of fuel oil in a tank can be detected over a wide range from the level of a sensing hole to a level sufficiently high above the sensing hole.

The foregoing objects and other objects of the invention have been achieved by the provision of an apparatus for detecting the level of fuel oil in a fuel oil storing tank in a vessel to control the quantity of fuel oil in the tank, which comprises: a sensing pipe having a closed top portion and a lower portion inserted into the tank, the lower portion having a sensing hole; a connecting pipe which is communicated with the sensing pipe at one end, the other end thereof being open to the atmosphere; a fluid pressure response device having a supply port, an exhaust port, a sensing port and an output port, and incorporating a passage communicating said supply port with the exhaust port, the sensing port being connected to the connecting pipe at one end, the output port being connected to an alarm device; a throttle means provided in the connecting pipe at a position between the one end of the sensing port and the other end of the connecting pipe opened to the atmosphere; and a gas supplying device communicated with the sensing pipe and communicated with the fluid pressure response device through the supply port, for continuously supplying gas to the sensing pipe and to the fluid pressure response device, the gas supplied to the sensing pipe being delivered through the sensing pipe to the exhaust port to be discharged therefrom, the gas supplied to the fluid pressure response device being delivered through the supply port and passage to the exhaust port to be discharged therefrom, and in which the pressure in the sensing pipe is being increased as the level of fuel oil is raised higher than the level of the sensing hole, and when the pressure in the sensing pipe reaches a value at which the fluid pressure response device is placed in the operable state, the fluid pressure response device closes the passage in response to the pressure to cause the gas to flow from the supply port to the output port to operate the alarm device, the pressure being adjustable with the throttle means, thereby to detect the level of fuel oil above the sensing means in the tank.

The novel features which are considered characteristic of this invention are set forth in the appended claims. This invention itself, however, as well as other objects and advantages thereof will be best understood by reference to the following detailed description of illustrative embodiments, when read in conjunction with the accompanying drawings, in which like parts are designated by like reference characters.

DETAILED DESCRIPTION OF THE INVENTION

Figure 1:
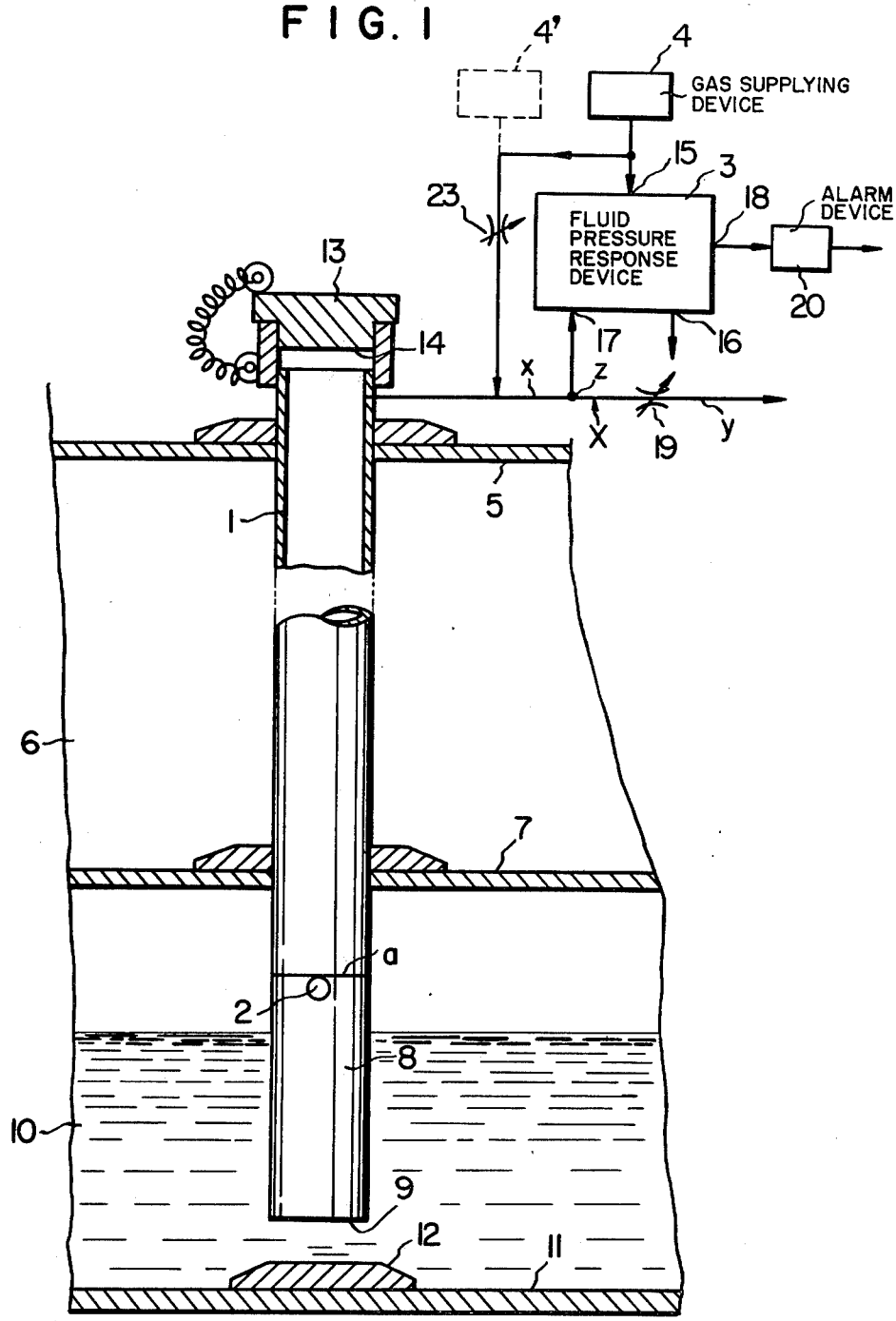
FIG. 1 is an explanatory diagram partly broken away and in longitudinal section showing one example of an apparatus for detecting the level of fuel oil in a tank of a vessel, according to this invention.
Figure 2:
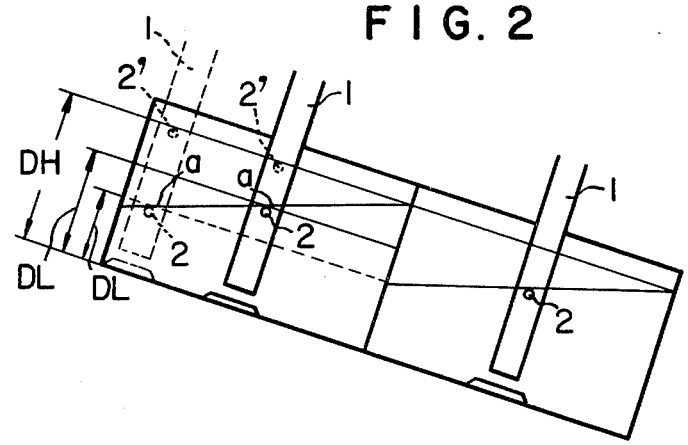
FIG. 2 is a diagram for a description of a critical overflow level with a vessel in the maximum trim.

A first example of an apparatus for detecting the level of liquid in a tank according to this invention, as shown in FIG. 1, comprises a sensing pipe 1, which may be a sounding pipe provided in the vessel in such a manner that it penetrates the upper deck 5, a hold 6 and the upper board 7 of the tank and extends toward a striking pad 12 fixedly mounted on the bottom 11 of a fuel oil storing tank 10 with a gap between the pad 12 and the open bottom 9 of the end 8 of the sounding pipe 1. The sounding pipe is, originally, provided for measuring the quantity of fuel oil in the tank 10. In the measurement, a cap 13 is removed from the sounding pipe, and a sounding scale with a weight at one end there is inserted into the sounding pipe through its inlet 14 at the top end thereof. The quantity of the fuel oil in the tank 10 is measured from the length of a wet portion of the sounding scale thus inserted. This sounding pipe is utilized as the sensing pipe 1 in the example which will be described in more detail below.

A sensing hole 2 is formed in the lower portion 8 of the conduit. The position of the sensing hole 2 is so determined that it is at the critical level "a" at which the overflow of the fuel oil is caused when the vessel is in the maximum trim.

The upper portion of the sensing pipe 1 is connected to one end of a connecting pipe X, the other end of which is open to the atmosphere.

In FIG. 1, reference numeral 3 is intended to designate a device which operates in response to the pressure in the conduit 1 (hereinafter referred to as "a fluid pressure response device 3" when applicable).

Figure 3A:
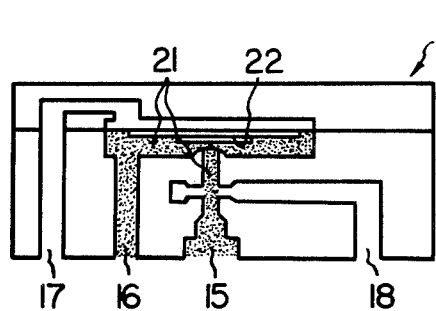
FIG. 3(a) shows a state of a fluid pressure response device observed before it is operated in response to a pressure.
Figure 3B:
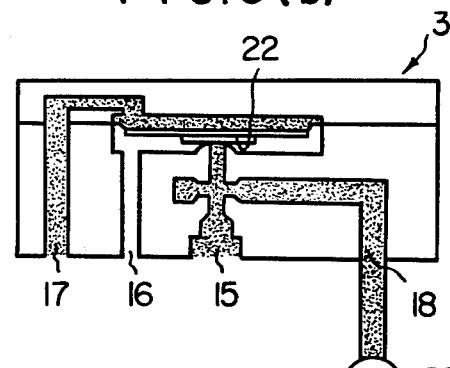
FIG. 3(b) shows a state of the fluid pressure response device observed when it is operated.

The fluid pressure response device 3, as shown in FIGS. 1, 3(a) and 3(b), comprises a supply port 15, an exhaust port 16, a sensing port 17, and an output port 18, and is connected to the connecting pipe X through the sensing port 17. An alarm device 20 is connected to the output port 18. Furthermore, a passage 21 communicating the supply port 15 with the exhaust port 16 is formed in the fluid pressure response device 3. The passage 21 is selectively opened and closed by means of a diaphragm 22 in response to the pressure in the sensing pipe as described later.

A throttle means 19 is provided in the connecting pipe X. More specifically, the throttle means 19 may be provided at a desired point in the portion "y" of the connecting pipe X, which extends to its open end from the connection point Z of the sensing port 17 and the connecting pipe X. The throttle means 19 may be a breeder throttle valve, an orifice valve, or the like. That is, all that is necessary for the throttle means 19 is to freely control the flow rate of fluid in the connecting pipe, or to freely throttle the connecting pipe from its fully open state to its fully closed state or vice versa.

Another throttle means 19 or a fluidic resistance means (not shown) may be provided in the portion "x" of the connecting pipe X to control (to decrease) the pressure in the sensing pipe 1.

Referring to FIG. 1, a gas supplying device 4 is communicated with the sensing pipe 1 through a check valve 23 and the connecting pipe X, and with the fluid pressure response device 3 through the supply port 15. The gas supplying device 4 is to continuously supply gas to the sensing pipe 1 and the fluid pressure response device 3. Accordingly, the gas supplying section 4 may be a cylinder containing air, nitrogen or inert gas, or an air compressor, for instance.

The operation of the apparatus thus constructed will be described. First, gas is supplied into the sensing pipe 1 and the fluid pressure response device 3 by means of the gas supplying device 4. The gas supplied into the sensing pipe 1 is allowed to flow through the conduit 1 and is finally discharged from the sensing hole 2. On the other hand, the gas supplied into the fluid pressure response device 3 is discharged through the supply port 15, the passage 21 and the exhaust port 16.

When the level of the fuel oil in the tank 10 is raised over the sensing hole 2, the pressure in the sensing pipe 1 is increased. As the distance between the fuel oil level and the sensing hole 2 is increased, that is, the fuel oil level is raised, the pressure in the sensing pipe 1 is increased. The reason for this is that a back pressure corresponding to the height of the fuel surface above the sensing hole is created in the sensing pipe 1, and the back pressure thus created is in proportion to the distance between the fuel level and the sensing hole 2.

A part or the whole of the pressure in the sensing pipe 1 is transmitted through the sensing port 17 to the fluid pressure response device 3. However, before the fuel oil level reaches the sensing hole 2, no pressure is created in the sensing pipe 1, and accordingly no pressure is applied to the sensing port 17. In this case, the gas in the fluid pressure response device 3 passes through the passage 21 and flows out of the exhaust port 16 as shown in FIG. 3(a). When the fuel oil level is raised over the sensing hole 2, the pressure in the sensing pipe 1 is increased if the throttle means 19 is fully closed. In this case, the pressure is transmitted through the connecting pipe X to the sensing port 17, as a result of which the diaphragm 22 is depressed to close the passage 21. Accordingly, the gas is forced to flow through the supply port 15 to the output port 18, and accordingly to the alarm device 20 connected thereto, as shown in FIG. 3(b), as a result of which the alarm device 20 gives an alarm.

A pressure for making the sensing port 17 sensitive, that is a sensing pressure depends on the throttling state of the throttle means 19. When the throttle means 19 is fully closed, the sensing port is in most sensitive state. Therefore, it is possible that as soon as the fuel oil level is raised over the sensing hole 2, the alarm device is operated. However, in the case where the fully closed throttle means 19 is slightly opened, the sensing port 17 cannot be made sensitive without increasing the pressure in the sensing pipe 1 to the extent that the pressure is higher than that obtained when the throttle means 19 is fully closed. This pressure increase is a back pressure corresponding to the height of the fuel oil surface above the sensing hole 2. That is, the fuel oil surface is raised above the sensing hole 2 as much as the pressure increase. This pressure increase corresponds to an increase in level detection. In this case, the alarm device is operated when the fuel oil level is raised to a level slightly higher than the level of the sensing hole 2 (not when the fuel oil level reaches the level of the sensing hole 2).

Thus, the aforementioned sensing pressure is at the lowest when the extent of closure of the throttle means 19 is at the maximum, but the sensing pressure is increased as the closed throttle means is opened. In the fluid pressure response device 3, when the pressure in the sensing pipe 1 reaches a value at which the device 3 is made operable, the passage 21 is closed by the diaphragm with the aid of the pressure, as a result of which the gas in the supply port 15 is forced to flow to the output port 18 thereby to operate the alarm device to give an alarm. As is apparent from the above description, the pressure can be controlled to a desired value by controlling the operation of the throttle means 19. In other words, the height of fuel oil surface above the sensing hole 2 can be determined from the throttling value of the throttle means 19.

Thus, with the apparatus according to the invention, it is possible to detect the level of the fuel oil in the tank by setting the throttling value of the throttle means, and thereby to control the quantity of fuel oil in the tank. Therefore it is possible to prevent the fuel oil from flowing over the tank. This means that fuel oil can be filled in the tank to a suitable quantity at all times regardless of the trim of the vessel.

Figure 4:
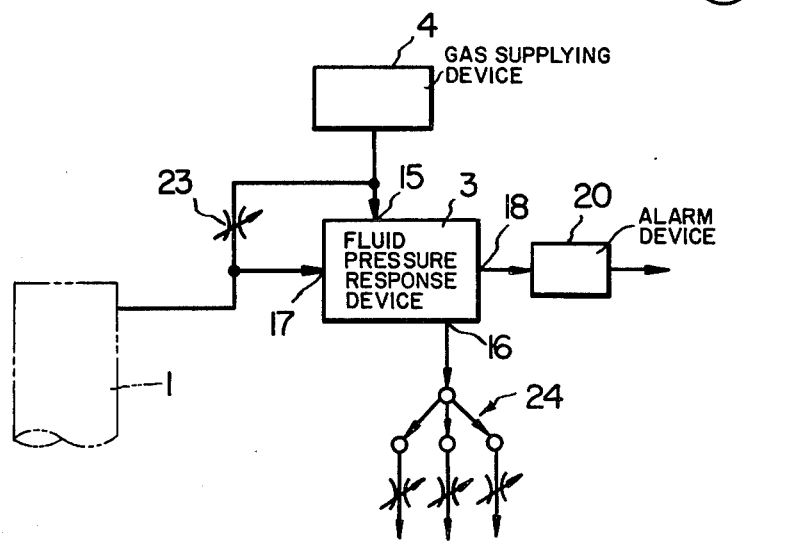
FIG. 4 is an explanatory block diagram showing another example of the apparatus according to the invention.

In the example described above, the gases supplied to the sensing pipe 1 and the fluid pressure response device 3 from the gas supplying section 4 are equal in pressure. However, it is desirable to make the pressure of gas supplied to the sensing pipe 1 higher than the pressure of gas supplied to the fluid pressure response device 3 in order to detect the level of the fuel oil over a sufficiently wide range of levels above the sensing hole 2, because in the case where the fluid pressure reponse device cannot receive gas at an excessively high pressure, if the gas supplied to the sensing pipe 1 and the gas supplied to the device 3 are equal in pressure, detection of the level is limited to a value determined by this pressure. For instance, if the limit of the gas pressure in the fluid pressure response device is $0.2/cm^2$ and gas is supplied at a pressure of 0.2 kg/cm$^2$ to the sensing pipe 1, the back pressure obtainable in the sensing pipe 1 is no more than 0.2 kg/cm$^2$. That is the level of fuel oil which can be detected is up to 2 m in water column. However, if gas at 0.2 kg/cm$^2$ is supplied to the fluid pressure response device 3 from the gas supplying device 4 as shown in FIG. 4, while gas at 1 kg/cm$^2$, for instance, is supplied to the sensing pipe 1 from another gas supplying device 4', then a back pressure of 1 kg/cm$^2$ is obtained in the sensing pipe 1, this value corresponding to 10 m in water column. Thus, the level of fuel oil can be detected to a value corresponding to 10 m in water column.

Another example of the apparatus is shown in FIG. 4. In this case, the connecting pipe X and the throttle means 19 shown in FIG. 1 are not employed; however, as is apparent from FIG. 4, the sensing port 17 of the fluid pressure response device 3 is communicated directly with the sensing pipe 1, and a back pressure varying device 24 is connected to the exhaust port 16.

The pressure in the sensing pipe 1 required to operate device 3 can be adjusted to a desired value by operating the back pressure varying device 24. When this pressure reaches a value corresponding to the back pressure in the exhaust port 16, the passage 21 in the fluid pressure response device 3 is closed in respone to that pressure, as a result of which the gas is forced to flow from the supply port 15 to the output port thereby to operate the alarm device.

The pressure in the sensing pipe 1 which is required to make the sensing port 17 sensitive is determined from the back pressure in the exhaust port 16. In the case where no back pressure is applied, the alarm device is operated immediately when the liquid level reaches the level of the sensing hole 2. However, in the case where the back pressure is applied to the exhaust port 16, the alarm is given when the pressure in the sensing pipe 1 reaches a value corresponding to the back pressure. The reason for this is that the back pressure is equal to an increase of the pressure in the sensing pipe 1. For instance, it is assumed that when the tank 10 is filled with a fuel oil having a specific gravity of 0.9 and the level of the fuel oil reaches a level 100 mm high above the sensing hole 2, the fluid pressure response device 3 closes its passage 21 in response to the pressure in the sensing pipe 1, as a result of which the gas is forced from the supply port 15 to the output port 18 thereby to operate the alarm device. In this case, the back pressure is 100mm×0.9=90mm Aq. (i.e., height of water column). Accordingly it can be understood that if the back pressure in the exhaust port 16 is set to 90 mm Aq, then the liquid level is 100 mm high above the sensing hole. That is, the liquid level can be determined from the back pressure in the exhaust port 16.

As is apparent from the above description, with the apparatus according to this invention, the level of fuel oil in the tank 10 can be detected by setting the exhaust port 16 to a desired value, to control the quantity of fuel oil in the tank 10. Therefore, it is possible to prevent the fuel oil from flowing over the tank 10, and furthermore it is possible to fill the tank with fuel oil to a suitable extent regardless of the trim of the vessel.

In the above-described embodiments, fuel oil is filled in the tank; however, the invention is not limited thereto or thereby. That is, the apparatus of the invention may be applied to the case also where detection of the level of liquid such as water, sea water, or the like is required.

With the apparatus according to the invention, the level of liquid in the tank can be detected over a sufficiently wide range from the level of the sensing hole to a level considerably higher than that of the sensing hole. In addition, the critical overflow level corresponding to the trim of a vessel can be detected readily, accurately and safely. Thus, the apparatus is considerably useful in practice.

What is claimed is:

1. In an apparatus for detecting the level of liquid preferably fuel oil in a fuel oil storing tank in a vessel to control the quantity of fuel oil in the tank for use with an alarm device, comprising a sensing pipe having a top portion closed and a lower portion inserted into said tank, a connecting pipe communicating with said sensing pipe at one end thereof, the other end thereof being open to the atmosphere, a fluid pressure response device defining a supply port, and exhaust port, a sensing port and an output port, and including a passage communicating said supply port with said exhaust port, said sensing port being connected to said connecting pipe at one end thereof, said output port being operatively connected to an alarm device, and gas supplying means communicating with said sensing pipe and communicating with said fluid pressure response device through said supply port, for continuously supplying gas to said sensing pipe and to said fluid pressure response device, the gas supplied to said sensing pipe being delivered through said sensing pipe to said exhaust port to be discharged therefrom, the gas supplied to said fluid pressure response device being delivered through said supply port and said passage to said exhaust port to be discharged therefrom, the improvement wherein:

(a) said sensing pipe constitutes a sounding pipe disposed in the vessel and defines a sensing hole at a lower portion thereof, and (b) throttle means, disposed in said connecting pipe at a position between said one end of the sensing port and said other end of the connecting pipe opening to the atmosphere, for placing said fluid pressure response device in a desired operable state, whereby, when the level of fuel oil is raised higher than the level of said sensing hole, the pressure in said sounding pipe is increased and when the pressure in said sounding pipe reaches a value at which said fluid pressure response device is placed in a desired operable state, means for causing said fluid pressure response device to close said passage in response to said pressure to cause the gas to flow from said supply port to said output port to operate the alarm device, said throttle means for adjusting said pressure thereby to detect the level of fuel oil in said tank above said sensing hole.

2. An apparatus as claimed in claim 1, in which the pressure of said gas supplied to said sounding pipe is higher than that of said gas supplied to said fluid pressure response device.

3. An apparatus as claimed in claim 1, in which the pressure of said gas supplied to said sounding pipe is equal to that of said gas supplied to said fluid pressure response device.

4. An apparatus as claimed in claim 1, wherein said means for causing said fluid pressure response device to close said passage includes a diaphragm for selectively opening and closing said passage in said fluid pressure response device 5. An apparatus as claimed in claim 1, in which said sensing hole is at a critical level on which the fuel oil in said tank is caused to flow over said tank when said vessel is in its maximum trim.

6. An apparatus as claimed in claim 1, in which said sensing port of said fluid pressure response device is communicated directly with said sounding pipe, and a back pressure varying means is connected to said exhaust port, and in which the pressure in said sounding pipe required to operate said fluid pressure response device is adjustable with said back pressure varying means, so that when said pressure reaches a value corresponding to the back pressure in said exhaust port, said fluid pressure response device is operated in response to said pressure to close said passage, thereby to cause the gas to flow from said supply port to said output to operate said alarm device.

7. An apparatus as claimed in claim 1, in which said gas is one selected from the group consisting of air, nitrogen and inert gas.

8. An apparatus as claimed in claim 1, in which instead of said fuel oil, a liquid which can be carried by said vessel is employed.

9. An apparatus as claimed in claim 8, in which said liquid is one selected from the group consisting of cargo oil, water and sea water.

* * * * *